United States Patent
Wu et al.

(10) Patent No.: US 12,386,743 B2
(45) Date of Patent: Aug. 12, 2025

(54) METHOD OF SHARING UNREAL ENGINE DERIVED DATA CACHE FILES

(71) Applicant: TENCENT AMERICA LLC, Palo Alto, CA (US)

(72) Inventors: Haitao Wu, Palo Alto, CA (US); Xin Wang, Palo Alto, CA (US); Zhong Wang, Palo Alto, CA (US); Kexue Wei, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/940,292

(22) Filed: Sep. 8, 2022

(65) Prior Publication Data

US 2024/0086320 A1    Mar. 14, 2024

(51) Int. Cl.
*G06F 12/0802*    (2016.01)

(52) U.S. Cl.
CPC ...... *G06F 12/0802* (2013.01); *G06F 2212/60* (2013.01)

(58) Field of Classification Search
CPC .......... G06F 12/0802; G06F 2212/60
See application file for complete search history.

(56) References Cited

U.S. PATENT DOCUMENTS

| | | | | |
|---|---|---|---|---|
| 8,805,901 B1 * | 8/2014 | Jacobs | | G06F 16/1767 |
| | | | | 707/625 |
| 2007/0016530 A1 * | 1/2007 | Stasi | | H04L 65/70 |
| | | | | 705/52 |
| 2013/0097170 A1 * | 4/2013 | Flanagan | | H04L 67/568 |
| | | | | 709/213 |
| 2017/0046381 A1 * | 2/2017 | Corbett | | G06F 16/2453 |
| 2020/0073905 A1 * | 3/2020 | Deng | | G06F 12/0811 |
| 2020/0159698 A1 * | 5/2020 | Das | | G06F 21/6218 |
| 2021/0149913 A1 * | 5/2021 | Kleinpeter | | G06F 16/951 |
| 2021/0271758 A1 * | 9/2021 | Bedhapudi | | G06F 16/1752 |
| 2022/0083533 A1 * | 3/2022 | Gustafsson | | G06F 16/2365 |
| 2022/0134222 A1 * | 5/2022 | Lebaredian | | G06T 15/08 |
| | | | | 463/31 |

OTHER PUBLICATIONS

Johnson, DW. Smith, TA; Dealing With Communications Failures in a Distributed File System; published Aug. 1, 1991; retrieved online Sep. 27, 2024, URL:<https:/priorart.ip.com/IPCOM/000121303> (Year: 1991).*
International Search Report dated Jun. 14, 2023 in Application No. PCT/US23/16041.
Written Opinion of the International Searching Authority dated Jun. 14, 2023 in Application No. PCT/US23/16041.

* cited by examiner

*Primary Examiner* — Eric T Oberly
(74) *Attorney, Agent, or Firm* — Sughrue Mion, PLLC (57) ABSTRACT

A method for modifying engine files, the method performed by at least one processor in one or more servers at a cloud based location, the method comprising receiving, by the one or more servers at the cloud based location from at least one host device, a derived data cache (DDC) generated by the at least one host device; distributing the DDC from the one or more servers at the cloud based location to one or more client locations, the one or more client locations performing at least one modification to the DDC; and receiving the modified DDC, by the one or more servers at the cloud based location from the one or more client locations.

16 Claims, 6 Drawing Sheets

METHOD OF SHARING UNREAL ENGINE DERIVED DATA CACHE FILES

FIELD OF THE INVENTION

The present disclosure relates generally to cloud computing, and more particularly to methods and apparatuses for game development with cloud file sharing.

BACKGROUND OF THE INVENTION

Game development in an Unreal Engine, a 3D computer graphics game engine, requires large pools of data that are heavily collaborated on. The size of such projects, in both man power and data, requires much processing of the Unreal Engine data. For such projects, the use of a Derived Data Cache (DDC) helps to process only parts of a large project to reduce the computation time for the average user. However, with increased size in data and development staff, conventional DDC are too slow. Therefore, improved techniques for processing large projects based on a DDC are required.

SUMMARY OF THE INVENTION

According to some embodiments, systems and methods are provided for a method for modifying engine files.

According to an exemplary embodiment, a method performed by at least one processor at a cloud based location. The method includes receiving, at the cloud based location from at least one host device, a derived data cache (DDC) generated by the at least one host device. Distributing the DDC from the cloud based location to one or more client locations for at least one modification of the DDC; and receiving the modified DDC at the cloud based location from the one or more client locations.

According to an exemplary embodiment, an apparatus for modifying engine files, the apparatus includes: at least one memory configured to store computer program code and at least one processor configured to operate as instructed by the computer program code. The at least one processor located at a cloud based location, the computer program code including: first receiving code configured to cause the at least one processor to receive, at the cloud based location from at least one host device, a derived data cache (DDC) generated by the at least one host device. Distributing code configured to cause the at least one processor to distribute the DDC from the cloud based location to one or more client locations for at least one modification to the DDC; and second receiving code configured to cause the at least one processor to receive the modified DDC at the cloud based location from the one or more client locations.

According to an exemplary embodiment, a non-transitory computer readable medium having instructions stored therein, which when executed by a processor in a cloud based location cause the processor to receive, at the cloud based location from at least one host device, a derived data cache (DDC) generated by the at least one host device. The instructions further cause the processor to distribute the DDC from the cloud based location to one or more client locations for at least one modification to the DDC; and receiving the modified DDC at the cloud based location from the one or more client locations.

DETAILED DESCRIPTION OF THE INVENTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

The present disclosure describes collaborated game development, which relies on an Unreal Engine, a 3D computer graphics game engine, and methods for use of a Derived Data Cache (DDC). In some embodiments, the methods are used to share Unreal Engine Derived Data Cache files from one location to multiple locations. Once setup, new or updated DDC files may continuously flow from source location to destination locations. The end benefit to users is that different locations reliant on the DDC don't need to wait Unreal Engine to update DDC files, which saves hours of loading and download time. Some embodiments may also be used to set up a full-meshed Derived Data Cache environment. In a game development studio, different sites may work together on the same title. One feature of the distributed DDC is that the DDC may enable collaborated development cross the globe.

Figure 1:
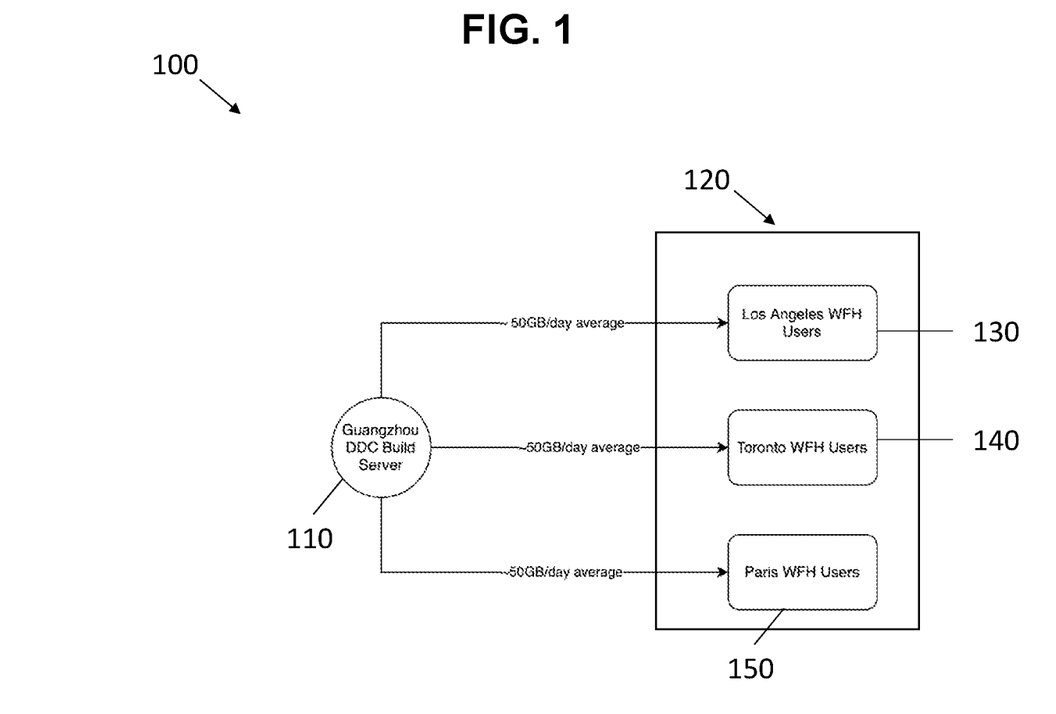
FIG. 1 is an embodiment of a distributed DDC.

FIG. 1 discloses an embodiment of a distributed Derived Data Cache 100. The distributed Derived Data Cache (DDC) 100 may use a singular build 110, which may be distributed among a plurality of clients 120 such as work from home (WFH) users in, for example, Los Angeles 130, Toronto 140, and Paris 150. In some embodiments, the WFH user may be a terminal, workstation, or other remote or local device capable of accessing the DDC. This DDC embodiment may provide a real time file system that monitors and records all changed files. In some embodiments, the DDC may be updated in a period (e.g., every 15 minutes), which scans all files and compare the files' last recorded date time with last collection start date time. Then, the period scan scans all the DDC files and compares the DDC file's last modified date and size with all the recorded results of previous scan results. After the distributed DDC is setup, this process may keep iterating to transfer any new/updated DDC files from source DDC location to multiple destination locations.

This distributed DDC 100 may provide real-time watching (e.g., monitoring) of any changes in one site and upload the DDC with optimized approach to a singular build 110. By leveraging the singular build 110, the distributed DDC 100 may replicate the data at high-speeds (e.g., gbps) globally. Additionally, monitoring changes in the singular build 110 and then re-build the data in the destination allows for better version control. Other benefits of the singular build 110 include, but are not limited to, a controller to setup global replication topology and control of cross site replication, progress tracking to improve user experience, daemon client, which runs on top of Windows client to enable the WFH scenario, and a NAS like file server in at least one destination to share Derived Data Cache data among hundreds of game developers.

The singular build 110 may be stored or computed in a server, a collection of servers, a personal computer, a mobile device, a cluster of computers, embedded device, ASIC, microcontroller, or any other device capable of running code. The singular build 110 may provide a DDC data for each of the plurality of clients 120. The plurality of clients 120 may be a server, a collection of servers, a personal computer, a mobile device, a cluster of computers, embedded device, ASIC, microcontroller, or any other device capable of running code. The plurality of clients 120 may access the DDC and update the DDC as needed during the development of a game in Unreal Engine.

Figure 2:
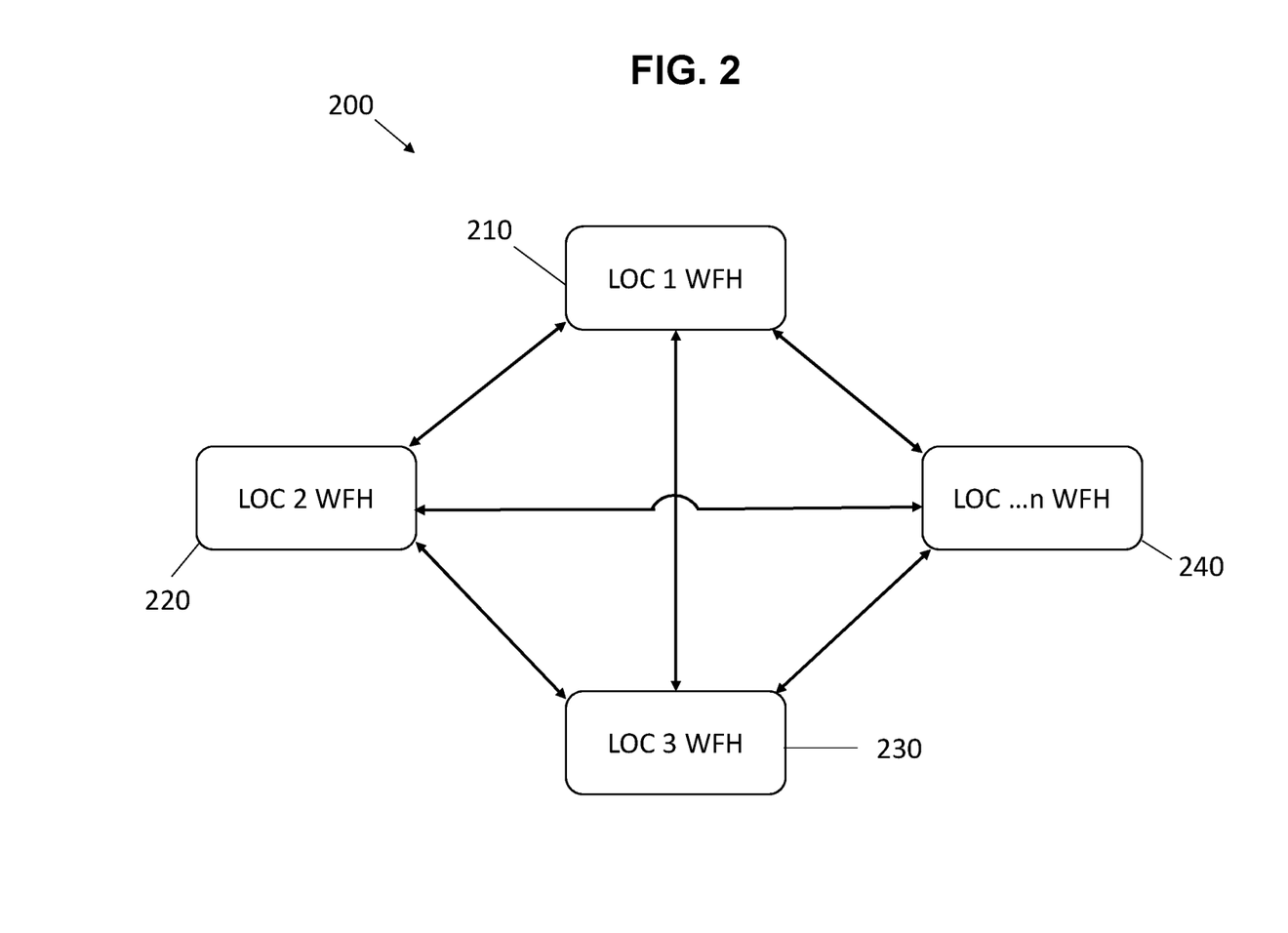
FIG. 2 is a fully meshed embodiment of the DDC.

FIG. 2 discloses an embodiment of a mesh Derived Data Cache 200. The mesh Derived Data Cache (DDC) 200 may use a singular build shared among a plurality of clients. Each of the clients may be connected with every other one of the clients. For example, LOC 1 WFH 210 may be connected to LOC 2 WFH 220, LOC 3 WFH 230, all the way to LOC n WFH 240. The DDC may be shared and may provide real time file system watching and record all changed files. In some embodiments, the DDC may be updated in a period (e.g., every 15 minutes), which scans all files and compare files' last recorded date time with last collection start date time. Then, the period scan scans all the DDC files and compares the DDC file's last modified date and size with all the recorded results of previous scan results. After the distributed DDC may be setup, this process may keep iterating to transfer any new/updated DDC files from source DDC location to multiple destination locations.

This mesh DDC 200 may provide real-time watching of any changes in one site and upload the DDC with optimized approach to a singular build. By leveraging the singular build, the distributed DDC 200 may replicate the data at high-speed (gbps) globally. Additionally, monitoring the changes singular build and re-build the data in the destination allows for better version control. Other benefits of the singular build include, but are not limited to a controller to setup global replication topology and control of cross site replication, progress tracking to improve user experience, daemon client, which runs on top of Windows client to enable the WFH scenario, and a NAS like file server in at least one destination to share Derived Data Cache data among hundreds of game developers.

The singular build may be shared among the plurality of clients, which may be a server, a collection of servers, a personal computer, a mobile device, a cluster of computers, embedded device, ASIC, microcontroller, or any other device capable of running code. The singular build may provide a DDC data for each of the plurality of clients. The plurality of clients may access the DDC and update the DDC as needed during the development of a game in Unreal Engine.

Figure 3:
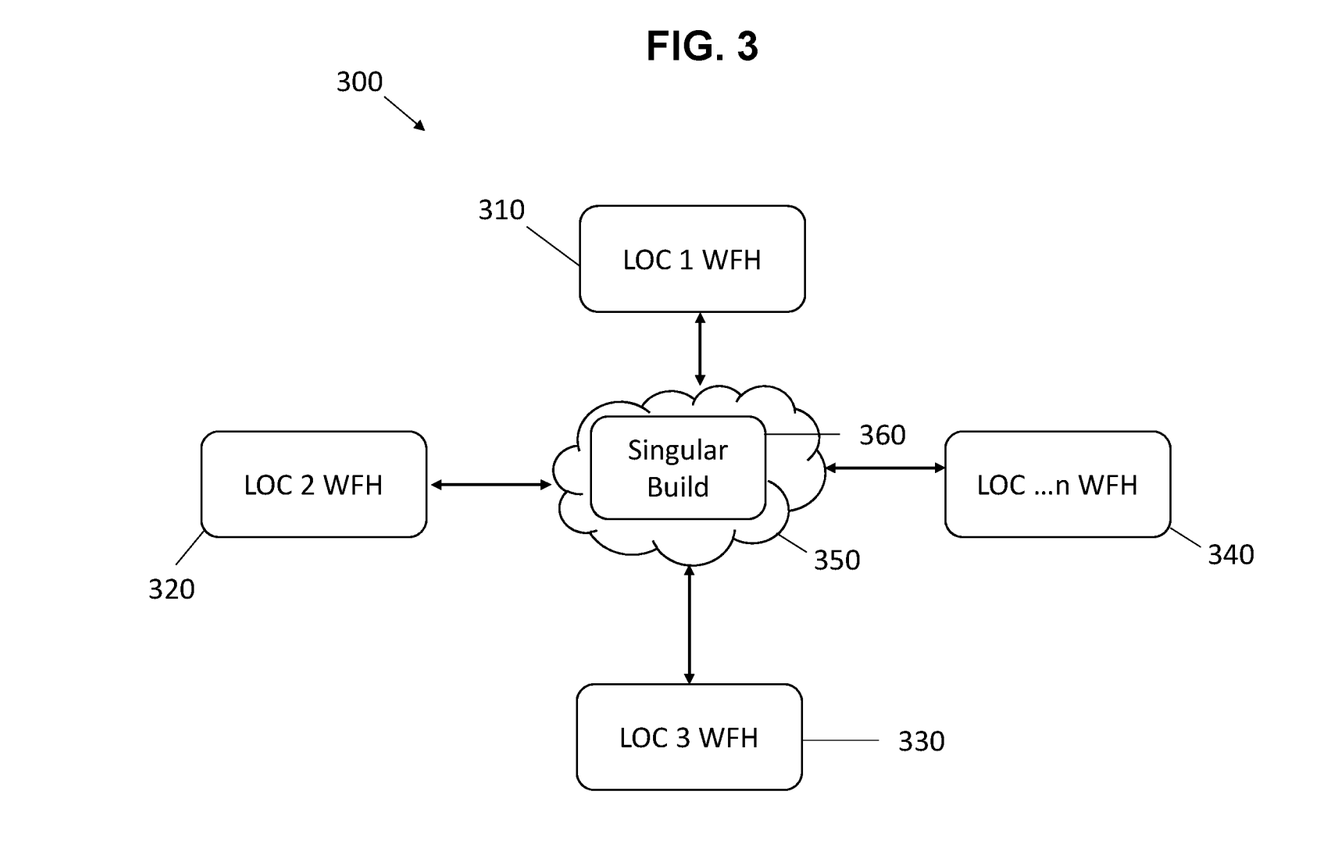
FIG. 3 is an embodiment of a cloud based DDC.

FIG. 3 discloses an embodiment of a cloud based Derived Data Cache 300. The cloud Derived Data Cache (DDC) 300 uses a singular build 360, which may be distributed among a plurality of clients, here, work from home (WFH) users in, for example, LOC 1 WFH 310, LOC 2 WFH 320, LOC 3 WFH 330 and all the way to LOC n WFH 340. This DDC embodiment may provide a real time file system that watches and records all changed files. In some embodiments, the DDC may be updated in a period (e.g., every 15 minutes), which scans all files and compare files' last recorded date time with last collection start date time. Then, the period scan scans all the DDC files and compares the DDC file's last modified date and size with all the recorded results of previous scan results. After the cloud DDC may be setup, this process may keep iterating to transfer any new/updated DDC files from source DDC location to multiple destination locations.

This cloud DDC 300 may provide real-time watching any changes in one site and upload the DDC with optimized approach to a singular build 360. By leverage the singular build 360, the cloud DDC 300 replicates the data at high-speed (gbps) globally. Additionally, monitoring the changes singular build 370 and re-build the data in the destination allows for better version control. Other benefits of the singular build 370 include, but are not limited to a controller to setup global replication topology and control of cross site replication, progress tracking to improve user experience, daemon client, which runs on top of Windows client to enable the WFH scenario, and a NAS like file server in at least one destination to share Derived Data Cache data among hundreds of game developers.

The singular build 370 may be stored or computed in a server, a collection of servers, a personal computer, a mobile device, a cluster of computers, embedded device, ASIC, microcontroller, or any other device capable of running code. The singular build 370 may provide a DDC data for each of the plurality of clients 310-340. The plurality of clients may be a server, a collection of servers, a personal computer, a mobile device, a cluster of computers, embedded device, ASIC, microcontroller, or any other device capable of running code. The plurality of clients access the DDC and update the DDC as needed during the development of a game in Unreal Engine.

Figure 4:
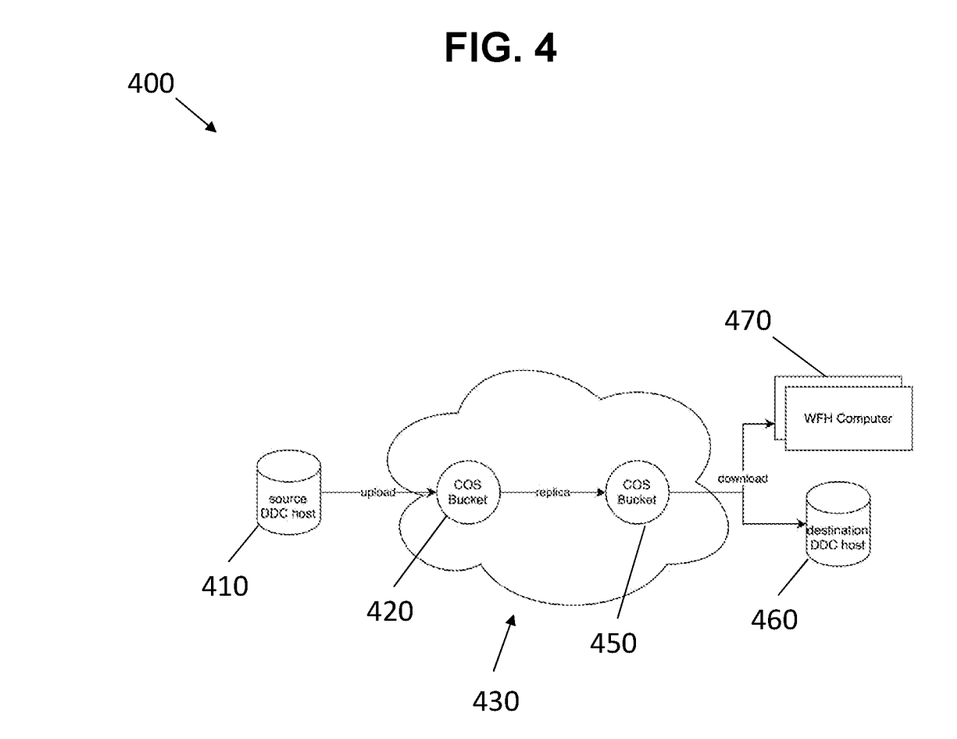
FIG. 4 is an embodiment of a cloud based DDC.

FIG. 4 discloses an embodiment of the cloud based Derived Data Cache 400. The cloud based Derived Data Cache 400 comprises a source DDC host 410, a cloud 430 comprising: a first cloud object storage (COS) bucket 420, a second COS bucket 450, a destination DDC host 460 and a WFH computer 470. The source DDC host 410 first uploads the DDC to the COS bucket 420, which then passes a replica DDC to the second COS bucket 450. Next the second COS bucket 450 distributes the DDC to the destination DDC host 460, which stores the DDC and the WFH computer 470, which may edit the DDC.

In some embodiments, the DDC source host 410 may be a server, a collection of servers, a personal computer, a mobile device, a cluster of computers, embedded device, ASIC, microcontroller, or any other device capable of running code and storing data. The could 430 may be a server, a collection of servers, a personal computer, a mobile device, a cluster of computers, embedded device, ASIC, microcontroller, or any other device capable of running code and storing data. Both of the COS buckets 420 and 430 are data structures, which may be encrypted and dispersed data across multiple geographic locations. The data structure may be a Container, a List, a Tuple, an Associative array, a Map, a Multimap, a Set, a Multiset (bag), a Stack, a Queue, a Double-ended queue, a Graph or any other data structure. The destination DDC host 460 may be a server, a collection of servers, a personal computer, a mobile device, a cluster of computers, embedded device, ASIC, microcontroller, or any other device capable of running code and storing data. The WFH computer 470 may be a server, a collection of servers, a personal computer, a mobile device, a cluster of computers, embedded device, ASIC, microcontroller, a terminal, a workstation, a locally connected or network connected computer or any other device capable of running code and storing data.

The cloud based Derived Data Cache 400 may provide for effective transfers of DDC files from source location to multiple global location continuously, such that all destination locations Unreal Engine (UE) users do not need to wait hours for UE to rebuild DDC files. Additionally, the cloud based Derived Data Cache 400 may comprise a global controller, which can enable global setup of the DDC. Next, the cloud based DDC 400 may run on top of multiple-cloud so that the cloud based DDC may serve multiple game studios and game developers virtually anywhere. Also, the cloud based Derived Data Cache 400 may allow directly sharing files to other location, eliminating the slowness of network speed and large latency. Finally, the Derived Data Cache 400 may provide for cost effective sharing of a large sized files to be transferred to destination locations in time.

Figure 5:
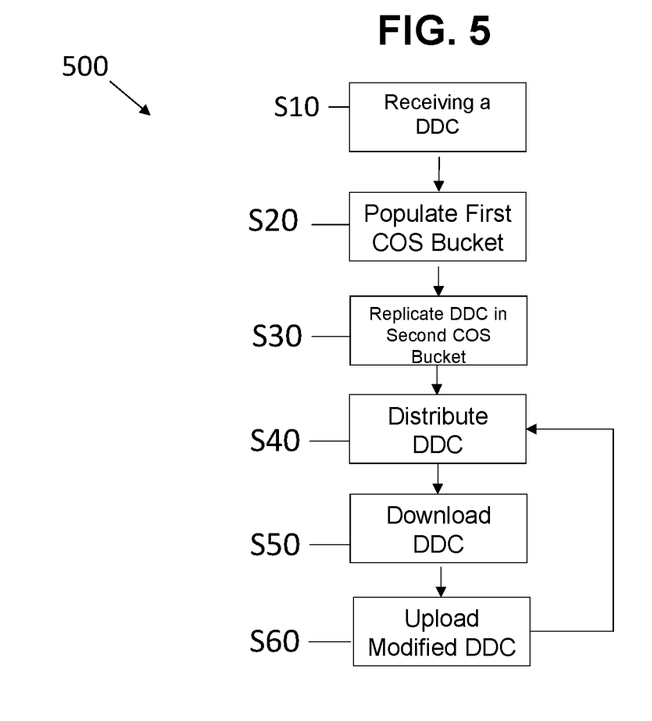
FIG. 5 is a flowchart of using the DDC.

FIG. 5 is a flow chart of an embodiment of the method for modifying the DDC. The operations detailed in the process 500 comprises at least one processor at the cloud based location, receiving from at least one host device, a DDC generated by the at least one host device (S10). The at least one processor at the cloud based location, populates the first COS bucket (S20), and replicates the DDC in the second COS bucket (S30). Then, the at least one processor distributes the DDC from the cloud based location to one or more client locations (S40), where then the DDC is downloaded (S50), the one or more client locations may perform at least one modification to the DDC. The at least one processor at the cloud based location may receive the modified DDC (S60) and then uploaded (S60) wherein the DDC may be downloaded and distributed again. In other embodiments, the DDC may be uploaded at prior operation in the process, such as uploading to the COS buckets or the Source Host.

Figure 6:
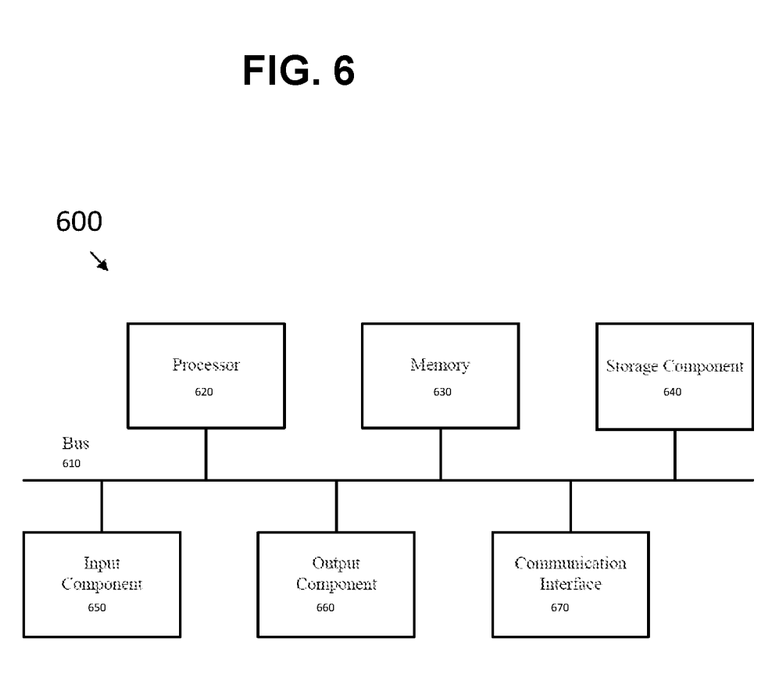
FIG. 6 is a system overview of an embodiment of a system for using the shared Unreal Engine DDC.

FIG. 6 illustrates an exemplary system 600 of an embodiment for using the shared Unreal Engine Derived Data Cache. The exemplary system 600, may be one of a variety of systems such as a personal computer, a mobile device, a cluster of computers, a server, embedded device, ASIC, microcontroller, or any other device capable of running code. Bus 610 connects the exemplary system 600 together such that all the components may communication with one another. The bus 610 connects the processor 620, the memory 630, the storage component 640, the input component 650, the output component 660 and the interface component.

The processor 620 may be a single processor, a processor with multiple processors inside, a cluster (more than one) of processors, and/or a distributed processing. The processor carries out the instructions stored in both the memory 630 and the storage component 640. The processor 620 operates as the computational device, carrying out operations for modifying the shared Unreal Engine Derived Data Cache. Memory 630 is fast storage and retrieval to any of the memory devices may be enabled through the use of cache memory, which may be closely associated with one or more CPU. Storage component 640 may be one of any longer term storage such as a HDD, SSD, magnetic tape or any other long term storage format.

Input component 650 may be any file type or signal from a user interface component such as a camera, a handheld controller, a game pad, a keyboard, a mouse or input capturing equipment, such as motion capture equipment. Output component 660 outputs the processed information to the communication interface 670. The communication interface may be a speaker or other communication device, such as a screen, which may display information to a user or a another observer such as another computing system.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that may direct a computer, a programmable data processing apparatus, and/or other devices to operate in a particular manner, such that the computer readable storage medium having instructions stored therein comprises an article of manufacture including instructions, which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions, which execute on the computer, other programmable apparatus, or other device implement the operations specified in the flowchart and/or block diagram block or blocks.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method for modifying engine files, the method performed by at least one processor at a cloud based location, the method including: receiving, at the cloud based location from at least one host device, a derived data cache (DDC) generated by the at least one host device; distributing the DDC from the cloud based location to one or more client locations for at least one modification of the DDC; and receiving the modified DDC at the cloud based location from the one or more client locations.

(2) The method for modifying engine files of feature (1), which the receiving the modified DDC is performed at a periodic interval.

(3) The method for modifying engine files of feature (1), which the at least one modification to the DDC includes compressing the DDC to generate the modified DDC.

(4) The method for modifying files of feature (1) or (3), which the receiving the modified DDC includes receiving a first compressed DDC from a first client location from the one or more client locations and receiving a second compressed DDC from a second client location from the one or more client locations, the method further comprising: unifying the first compressed DDC and the second compressed DDC.

(5) The method for modifying engine files of feature (4), which the unifying the first compressed DDC and the second compressed DDC includes comparing a previously recorded DDC with the first compressed DDC and the second compressed DDC, and recording a difference between the first compressed DDC and the previously recorded DDC and a difference between the second compressed DDC and the previously recorded DDC.

(6) The method for modifying engine files of feature (1), further including: populating at least one cloud object storage bucket in the cloud based location with at least one DDC that is one of (i) the DDC received from the host device, and (ii) the modified DDC received from the one or more client locations.

(7) The method for modifying engine files of feature (6), which the populating at least one cloud object storage with at least one DDC includes replicating at least one DDC in a second at least one cloud object storage.

(8) An apparatus for modifying engine files, the apparatus including: at least one memory configured to store computer program code; at least one processor configured to operate as instructed by the computer program code, the at least one processor located at a cloud based location, the computer program code including: first receiving code configured to cause the at least one processor to receive, at the cloud based location from at least one host device, a derived data cache (DDC) generated by the at least one host device; distributing code configured to cause the at least one processor to distribute the DDC from the cloud based location to one or more client locations for at least one modification to the DDC; and second receiving code configured to cause the at least one processor to receive the modified DDC at the cloud based location from the one or more client locations.

(9) The apparatus for modifying engine files of feature (8), which: the second receiving code is further configured to cause the at least one processor to receive the modified DDC at a periodic interval.

(10) The apparatus for modifying engine files of feature (8), wherein the at least one modification to the DDC includes compressing the DDC to generate the modified DDC.

(11) The apparatus for modifying files of feature (8) or (10), which the second receiving code is further configured to cause the at least one processor to receive a first compressed DDC from a first client location from the one or more client locations and receive a second compressed DDC from a second client location from the one or more client locations, and wherein the computer program code further includes unifying code configured to cause the at least one processor to unify the first compressed DDC and the second compressed DDC.

(12) The apparatus for modifying engine files of feature (11), which the unifying code further includes comparison code configured to cause the at least one processor to compare a previously recorded DDC with the first compressed DDC and the second compressed DDC, and recording code configured to cause the at least one processor to record a difference between the first compressed DDC and the previously recorded DDC and a difference between the second compressed DDC and the previously recorded DDC.

(13) The apparatus for modifying engine files of feature (8), which the computer program code further includes: populating code configured to cause the at least one processor to populate at least one cloud object storage bucket in the cloud based location with at least one DDC that is one of (i) the DDC received from the host device, and (ii) the modified DDC received from the one or more client locations.

(14) The apparatus for modifying engine files of feature (13), which the populating code further includes replicating code configured to cause the at least one processor to replicate the at least one DDC in a second at least one cloud object storage.

(15) A non-transitory computer readable medium having instructions stored therein, which when executed by a processor in a cloud based location cause the processor to: receive, at the cloud based location from at least one host device, a derived data cache (DDC) generated by the at least one host device; distribute the DDC from the cloud based location to one or more client locations for at least one modification to the DDC; and receiving the modified DDC at the cloud based location from the one or more client locations.

(16) The non-transitory computer readable medium according to feature (15), which the receiving the modified DDC is performed at a periodic interval.

(17) The non-transitory computer readable medium according to feature (15), which the at least one modification to the DDC includes compressing the DDC to generate the modified DDC.

(18) The non-transitory computer readable medium according to feature (15) or (17), which the receiving the modified DDC includes receiving a first compressed DDC from a first client location from the one or more client locations and receiving a second compressed DDC from a second client location from the one or more client locations, the method further comprising: unifying the first compressed DDC and the second compressed DDC.

(19) The non-transitory computer readable medium according to feature (18), wherein the unifying the first compressed DDC and the second compressed DDC includes comparing a previously recorded DDC with the first compressed DDC and the second compressed DDC, and recording a difference between the first compressed DDC and the previously recorded DDC and a difference between the second compressed DDC and the previously recorded DDC.

(20) The non-transitory computer readable medium according to feature (15), the method further including: populating at least one cloud object storage bucket in the cloud based location with at least one DDC that is one of (i) the DDC received from the host device, and (ii) the modified DDC received from the one or more client locations; and wherein the populating the at least one cloud object storage with the at least one DDC includes replicating the at least one DDC in a second at least one cloud object storage.

What is claimed is:

1. A method for modifying Unreal engine files, the method performed by at least one processor at a cloud based location, the method comprising:

receiving, at the cloud based location from at least one host device, an Unreal engine derived data cache (DDC) generated by the at least one host device, the Unreal engine DDC comprising one or more gaming engine files generated by a 3D computer graphics game engine;

populating a first cloud object storage bucket in the cloud based location with the Unreal engine DDC;

populating a second cloud object storage bucket in the cloud based location with a replica of the Unreal engine DDC;

distributing, from the second cloud object storage bucket, the Unreal engine DDC generated by the at least one host device from the cloud based location to one or more client locations that rebuild at least one of the one or more gaming engine files for at least one modification of the Unreal engine DDC; and receiving the modified Unreal engine DDC at the cloud based location from the one or more client locations, wherein the cloud based location comprises a plurality of servers configured to implement a file system that monitors changes by the one or more client locations and updates the Unreal engine DDC.

2. The method for modifying engine files of claim 1, wherein the receiving the modified Unreal engine DDC is performed at a periodic interval.

3. The method for modifying engine files of claim 1, wherein the at least one modification to the Unreal engine DDC includes compressing the Unreal engine DDC to generate the modified Unreal engine DDC.

4. The method for modifying engine files of claim 3, wherein the receiving the modified Unreal engine DDC includes receiving a first compressed Unreal engine DDC from a first client location from the one or more client locations and receiving a second compressed Unreal engine DDC from a second client location from the one or more client locations, the method further comprising:

unifying the first compressed Unreal engine DDC and the second compressed Unreal engine DDC.

5. The method for modifying engine files of claim 4, wherein the unifying the first compressed Unreal engine DDC and the second compressed Unreal engine DDC includes comparing a previously recorded Unreal engine DDC with the first compressed Unreal engine DDC and the second compressed Unreal engine DDC, and recording a difference between the first compressed Unreal engine DDC and the previously recorded Unreal engine DDC and a difference between the second compressed Unreal engine DDC and the previously recorded Unreal engine DDC.

6. An apparatus for modifying engine files, the apparatus comprising:

at least one memory configured to store computer program code;

at least one processor configured to operate as instructed by the computer program code, the at least one processor located at a cloud based location, the computer program code including:

first receiving code configured to cause the at least one processor to receive, at the cloud based location from at least one host device, an Unreal engine derived a-derived data cache (DDC) generated by the at least one host device, the Unreal engine DDC comprising gaming engine files generated by a 3D computer graphics game engine;

first populating code configured to cause the at least one processor to populate a first cloud object storage bucket in the cloud based location with the Unreal engine DDC;

second populating code configured to cause the at least one processor to populate a second cloud object storage bucket in the cloud based location with a replica of the Unreal engine DDC;

distributing code configured to cause the at least one processor to distribute, from the second cloud object storage bucket, the Unreal engine DDC generated by the at least one host device from the cloud based location to one or more client locations that rebuild at least one of the one or more gaming engine files for at least one modification to the Unreal engine DDC; and second receiving code configured to cause the at least one processor to receive the modified Unreal engine DDC at the cloud based location from the one or more client locations, wherein the cloud based location comprises a plurality of servers configured to implement a file system that monitors changes by the one or more client locations and updates the Unreal engine DDC.

7. The apparatus for modifying engine files of claim 6, wherein:

the second receiving code is further configured to cause the at least one processor to receive the modified Unreal engine DDC at a periodic interval.

8. The apparatus for modifying engine files of claim 6, wherein the at least one modification to the Unreal engine DDC includes compressing the Unreal engine DDC to generate the modified Unreal engine DDC.

9. The apparatus for modifying files of claim 8, wherein the second receiving code is further configured to cause the at least one processor to receive a first compressed Unreal engine DDC from a first client location from the one or more client locations and receive a second compressed Unreal engine DDC from a second client location from the one or more client locations, and wherein the computer program code further includes unifying code configured to cause the at least one processor to unify the first compressed Unreal engine DDC and the second compressed Unreal engine DDC.

10. The apparatus for modifying engine files of claim 9, wherein the unifying code further includes comparison code configured to cause the at least one processor to compare a previously recorded Unreal engine DDC with the first compressed Unreal engine DDC and the second compressed Unreal engine DDC, and recording code configured to cause the at least one processor to record a difference between the first compressed Unreal engine DDC and the previously recorded Unreal engine DDC and a difference between the second compressed Unreal engine DDC and the previously recorded Unreal engine DDC.

11. A non-transitory computer readable medium having instructions stored therein, which when executed by a processor in a cloud based location cause the processor to:

receive, at the cloud based location from at least one host device, an Unreal engine derived data cache (DDC) generated by the at least one host device, the Unreal engine DDC comprising gaming engine files generated by a 3D computer graphics game engine;

populate a first cloud object storage bucket in the cloud based location with the Unreal engine DDC;

populate a second cloud object storage bucket in the cloud based location with a replica of the Unreal engine DDC;

distribute, from the second cloud object storage bucket, the Unreal engine DDC generated by the at least one host device from the cloud based location to one or more client locations that rebuild at least one of the one or more gaming engine files for at least one modification to the Unreal engine DDC; and receiving the modified Unreal engine DDC at the cloud based location from the one or more client locations, wherein the cloud based location comprises a plurality of servers configured to implement a file system that monitors changes by the one or more client locations and updates the Unreal engine DDC.

12. The non-transitory computer readable medium according to claim 11, wherein the receiving the modified Unreal engine DDC is performed at a periodic interval.

13. The non-transitory computer readable medium according to claim 11, wherein the at least one modification to the Unreal engine DDC includes compressing the Unreal engine DDC to generate the modified Unreal engine DDC.

14. The non-transitory computer readable medium according to claim 13, wherein the receiving the modified Unreal engine DDC includes receiving a first compressed Unreal engine DDC from a first client location from the one or more client locations and receiving a second compressed Unreal engine DDC from a second client location from the one or more client locations, the method further comprising:

unifying the first compressed Unreal engine DDC and the second compressed Unreal engine DDC.

15. The non-transitory computer readable medium according to claim 14, wherein the unifying the first compressed Unreal engine DDC and the second compressed Unreal engine DDC includes comparing a previously recorded Unreal engine DDC with the first compressed Unreal engine DDC and the second compressed Unreal engine DDC, and recording a difference between the first compressed DDC and the previously recorded Unreal engine DDC and a difference between the second compressed Unreal engine DDC and the previously recorded Unreal engine DDC.

16. The non-transitory computer readable medium according to claim 11, the method further comprising:

populating at least one cloud object storage bucket in the cloud based location with at least one Unreal engine DDC that is one of (i) the Unreal engine DDC received from the host device, and (ii) the modified Unreal engine DDC received from the one or more client locations; and wherein the populating the at least one cloud object storage with the at least one Unreal engine DDC includes replicating the at least one Unreal engine DDC in a second at least one cloud object storage.

\* \* \* \* \*